United States Patent [19]

Solund

[11] Patent Number: 5,076,419
[45] Date of Patent: Dec. 31, 1991

[54] CONVEYOR, IN PARTICULAR FOR HEAVY OBJECTS

[75] Inventor: Jorgen Solund, Tappernoje, Denmark

[73] Assignee: Comstore A/S, Tappernoje, Denmark

[21] Appl. No.: 543,748

[22] PCT Filed: Jan. 27, 1989

[86] PCT No.: PCT/DK89/00014

§ 371 Date: Jul. 12, 1990

§ 102(e) Date: Jul. 12, 1990

[87] PCT Pub. No.: WO89/07080

PCT Pub. Date: Aug. 10, 1989

[30] Foreign Application Priority Data

Jan. 29, 1988 [DK] Denmark ............... 442/89

[51] Int. Cl.$^5$ .............................................. B65G 25/00
[52] U.S. Cl. .............................. 198/774.1; 198/774.3
[58] Field of Search .................... 198/750, 774.1, 774.3

[56] References Cited

U.S. PATENT DOCUMENTS

| | | |
|---|---|---|
| 3,451,532 | 1/1969 | Manterfield . |
| 3,590,987 | 6/1971 | Evans et al. . |
| 4,294,347 | 10/1981 | Furlette et al. ............ 198/774.1 X |
| 4,522,297 | 6/1985 | Jaegers ............................ 198/774.1 |
| 4,600,099 | 7/1986 | Peddinghaus ................ 198/774.1 X |

FOREIGN PATENT DOCUMENTS

| | | |
|---|---|---|
| 2237121 | 2/1974 | Fed. Rep. of Germany . |
| 3638580 | 5/1988 | Fed. Rep. of Germany ...... 198/773 |
| 2194630 | 3/1974 | France . |
| 2202829 | 5/1974 | France . |
| 2536726 | 6/1984 | France ............................ 198/774.1 |
| 8702339 | 4/1987 | PCT Int'l Appl. .............. 198/774.3 |
| 751726 | 7/1980 | U.S.S.R. . |

Primary Examiner—Robert P. Olszewski
Assistant Examiner—James R. Bidwell
Attorney, Agent, or Firm—Browdy and Neimark

[57] ABSTRACT

A conveyor consisting of a U-shaped stationary track (1) with the opening upwards. A rod-shaped support (2) may be reciprocated in said stationary track, the upper edge of said rod-shaped support (2) being lifted above the opening of the stationary track (1) upon movement in the forward direction and being lowered below this opening upon movment in the return direction. To simplify the manufacture and operation of the conveyor the rod-shaped support (2) is connected with a rail (4), slidable in the bottom of the U-shaped stationary track (1), by use of rotatable links (3). The rod-shaped support (2) and the rail (4) form two sides in a parallelogram whose other sides are the rotatable links so that the rod-shaped support (2) and the rail (4) are both rotatably connected with a handle (87), which is used for displacing these two parts with respect to each other and thereby lifting or lowering the upper edge of the rod-shaped support with respect to the opening of the stationary track (1).

7 Claims, 2 Drawing Sheets

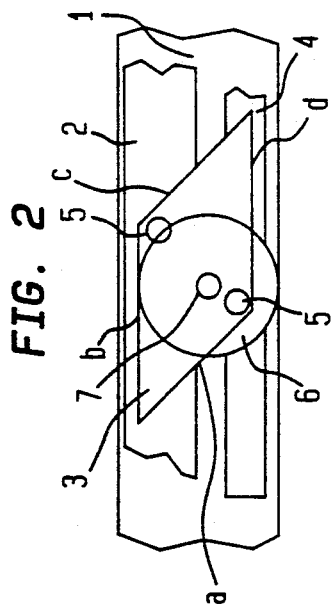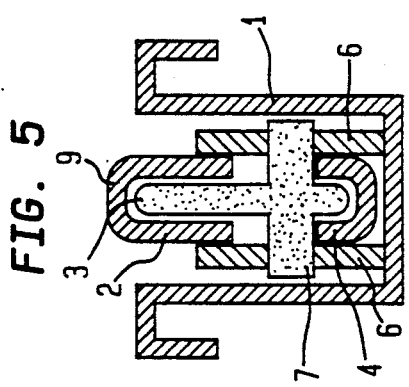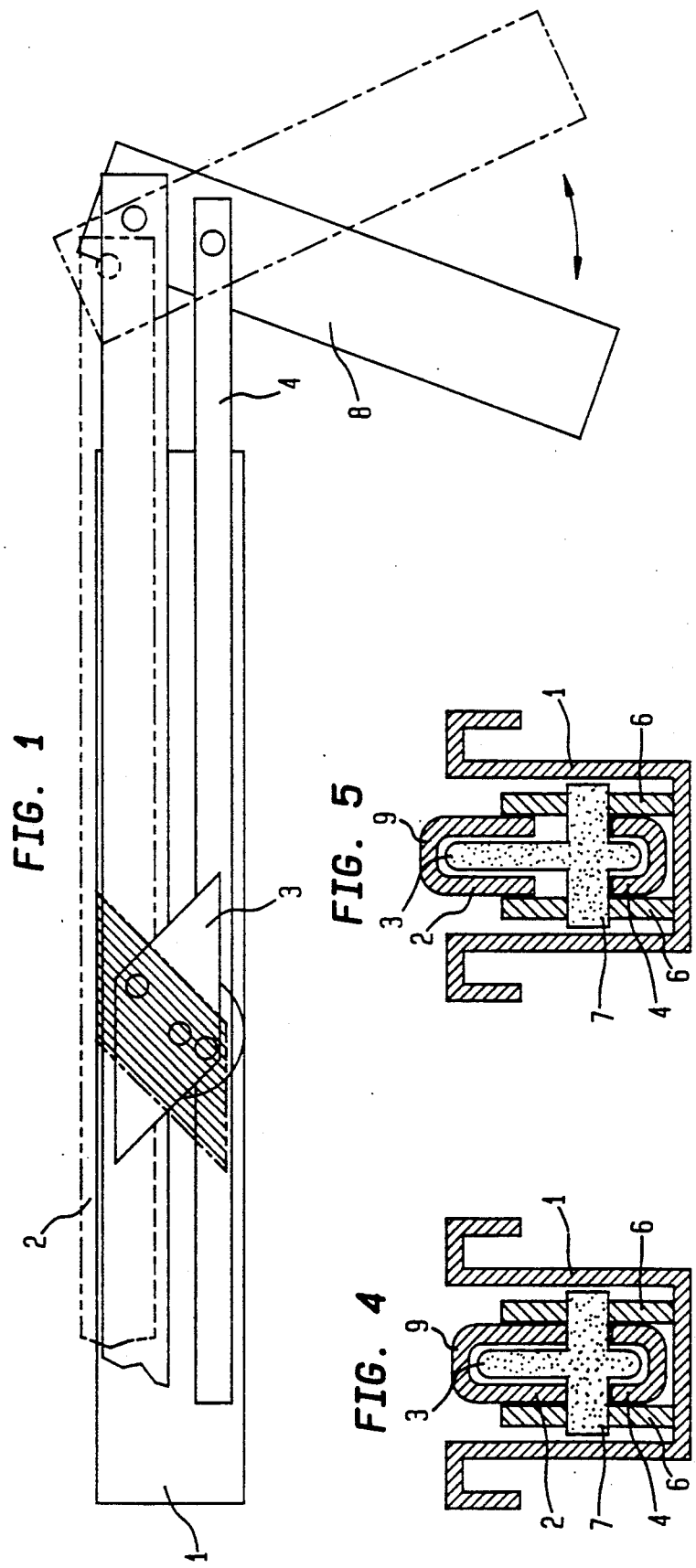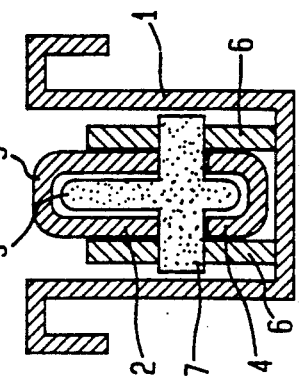

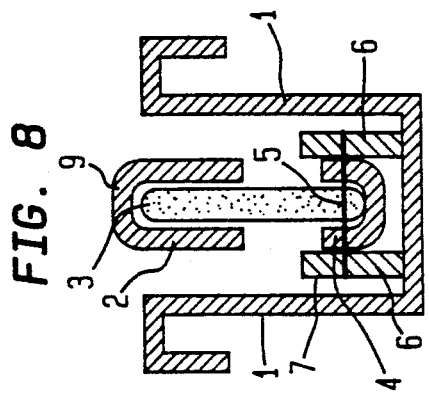
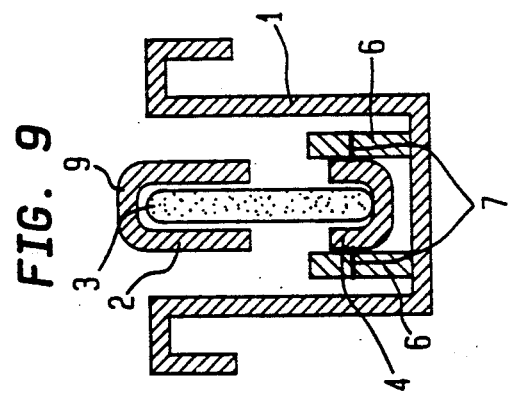
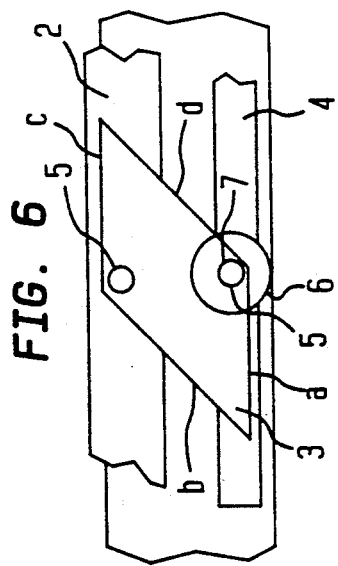
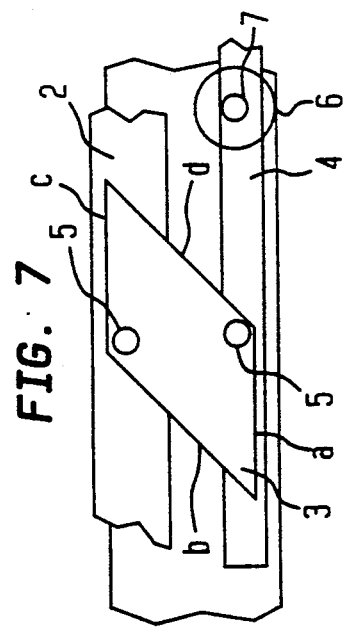

CONVEYOR, IN PARTICULAR FOR HEAVY OBJECTS

The invention concerns a conveyor which facilitates the movement of heavy objects resting on the conveyor.

A conveyor of this type is known from SU-A-751726. Here, the rotatable links are formed as rods. Two of such pivoted rods are in the form of twin-arm levers pivoted to each other by a rigid tie on which there is a spacer co-acting with fixed stops and limiters as the load rises and falls. This is an extremely complicated and expensive construction which, due to said limiters, can only transport the heavy objects to the left.

The object of the invention is to provide a conveyor of the type stated in the opening paragraph which is simpler and cheaper to manufacture, which is easy to operate, and which can transport the objects both to the left and to the right.

This is achieved according to the invention in that the conveyor stated in the opening paragraph has an upper load carrying rod-shaped rail which can be easily moved laterally by simple mechanical apparatus.

The invention will be described more fully below with reference to the drawing, in which FIG. 1 is a lateral view of the conveyor of the invention. The conveyor is shown partly in the raised position in broken lines in which an object resting on the conveyor can be transported to the right by a rod-shaped means. The conveyor is also shown partly in the lowered position in solid lines in which the rod-shaped means 2 of the conveyor may be moved back to the left without moving the object resting on the conveyor.

FIGS. 2 and 3 show a section of the conveyor in the lowered and raised positions, respectively.

FIGS. 4 and 5 show a vertical cross-section of FIG. 2 and FIG. 3, respectively.

FIGS. 6 and 7 show wheels to facilitate movement fixed at two alternative positions, and FIGS. 8 and 9 show a vertical cross-section of FIGS. 6 and 7, respectively.

The conveyor shown in the drawing comprises a cross-sectionally U-shaped stationary means 1 whose opening faces upwardly.

The means 1 contains a rod-shaped means 2 which is connected to a rail 4 by means of a plurality of uniform rotatable links 3, only one of which being shown in the drawing. The connection between each of the rotatable links 3 and the rod-shaped means 2 consists of a rotatable pin 5, and the connection between each of the rotatable links 3 and the rail 4 consists of a corresponding rotatable pin 5. The distance between the rotatable pins 5 in the rod-shaped means 2 is the same as the distance between the rotatable pins 5 in the rail 4, so that the rod-shaped means 2 and the rail 4 form two parallel sides of a parallelogram, whose other sides are the rotatable links 3 or more particularly the distance between the two rotatable pins 5 in each link 3.

Stop means are provided to limit the movement of the parallelogram connection when the rod-shaped means 2 is displaced longitudinally with respect to the rail 4. These stop means are provided by forming the rotatable links 3 as parallelogram-shaped plates each parallelogram shaped plate having two obtuse angles, as shown in FIGS. 1, 2 and 3. In one extreme position which is shown in FIG. 3 and in which the rod-shaped means 2 is raised with respect to the rail 4, the two parallel sides a and c of the links 3 engage the rod-shaped means 2 and the rail 4, and in the other extreme position which is shown in FIG. 2 and in which the rod-shaped means 2 is lowered with respect to the rail 4, the two other parallel sides b and d of the links 3 engage the rod-shaped means 2 and the rail 4.

This parallelogram connection consisting of the rod-shaped means 2, the rail 4 and the connecting rotatable links 3 is journalled in the bottom of the stationary means 1, so that the parallelogram connection 2, 3, 4 can be moved horizontally to the right or to the left in FIG. 1.

To reduce the frictional resistance in the displacement of the parallelogram connection 2, 3, 4 in the stationary means 1, this parallelogram connection is provided with wheels 6 whose shafts 7 may be secured in one modification to the rail 4 (not shown) or, as shown in the drawing, integrally connected to rotatable links 3. In this modification shaft 7 is close to the pin 5 on link 3 which rotates in rail 4. Locating shaft 7 close to pin 5 in rail 4 maintains the height of said shafts 7 above the bottom of the stationary means 2 constant during conveyor movement or nearly constant. Shafts 7 may also be secured to one of the rotatable pins 5 as an extension of pins 5 which connect the rail 4 with a parallelogram-shaped plate.

Displacement in a horizontal direction of the rod-shaped means 2 with respect to the rail 4 is obtained by means of the handle 8, which is shown in FIG. 1 and which may simultaneously be used for displacing the parallelogram connection 2, 3, 4 horizontally in the stationary means 1.

In the raised position of the parallelogram connection 2, 3, 4 the upper edge 9 of the rod-shaped means 2 extends upwardly above the opening of the stationary means 1, as shown in FIGS. 3 and 5 and with broken lines in FIG. 1. This position is obtained when the handle 8 in FIG. 1 is pulled to the right and objects (not shown) disposed on or suspended from the conveyor, e.g. on hangers, are transported to the right.

On the other hand, in the lowered position of the parallelogram connection the upper edge 9 of the rod-shaped means 2 is disposed below the opening of the stationary means 1, as shown in FIGS. 2 and 4 and with solid lines in FIG. 1. This position is obtained when the handle 8 in FIG. 1 is pushed to the left, and the said objects on the conveyor will still rest on the stationary means 1.

Accordingly, as an overall result objects on the conveyor will be transported to the right in FIG. 1 when the handle 8 is reciprocated.

Instead of the handle 8, it is of course also possible to use another motion mechanism, e.g. a jack or a piston mechanism.

Instead of the wheels 6, slide blocks might be used, which are capable of taking up greater loads than the wheels 6.

Two or more conveyors may be placed in mutual spaced and parallel relationship, and the objects may be positioned so as to rest on several conveyors simultaneously.

It is hereby possible to transport heavier and larger objects. These conveyors arranged in parallel may be positioned between guides (not shown) preventing the transported objects from falling down at one or the other side of these parallel conveyors.

I claim:

1. A conveyor, in particular for heavy objects, and consisting of a cross-sectionally U-shaped stationary means (1) with the opening facing upwardly and a rod-shaped means (2) reciprocable in said stationary means (1) by a motion mechanism, the upper edge (9) of said rod-shaped means (2) being adapted to be lifted upwardly above the opening of the stationary means (1) upon movement in the forward direction and to be lowered below this opening upon movement in the return direction by coupling means, which rod-shaped means (2) is so connected to a rail (4), slidable in the bottom of the U-shaped stationary means (1), by means of rotatable links (3) that the rod-shaped means (2) and the rail (4) form two parallel sides of a parallelogram whose other two sides are the rotatable links (3), stop means being provided to restrict the movement of the parallelogram when the rod-shaped means (2) is moved longitudinally in one or the other direction with respect to the rail (4), to an extreme position in which the upper edge (9) of the rod-shaped means (2) is lifted upwardly above the opening of the stationary means (1) and another extreme position in which said upper edge (9) is lowered below said opening, respectively, characterized in that said rotatable links (3) are parallelogram-shaped plates (3) having obtuse angles which are rotatably connected with the rod-shaped means (2) and the rail (4), respectively, at apexes of said obtuse angles, said stop means comprising sides of said parallelogram-shaped plates (3), opposing sides of said sides adapted to form stop means in one or the other extreme position upon engagement of said opposing sides with the rod-shaped means and the rail, respectively.

2. A conveyor according to claim 1, characterized in that a handle (8) rotatably connected with the rod-shaped means (2) and the rail (4) is adapted to move the rod-shaped means (2) with respect to the rail (4).

3. A conveyor according to claim 1, characterized in that both the rod-shaped means (2) and the rail (4) are U-shaped in cross-section with the openings facing towards each other and substantially surrounding said rotatable links (3).

4. A conveyor according to claim 1, characterized in that the rail (4) is supported by means of wheels (6) during movement in the stationary body (1).

5. A conveyor according to claim 1, characterized in that shafts (7) for said wheels (6) are secured to said parallelogram-shaped plates (3).

6. A conveyor according to claim 4, characterized in that shafts (7) for said wheels (6) are secured in the rail (4).

7. A conveyor according to claim 6, characterized in that shafts (7) for said wheels (6) are secured to rotatable pins (5) connecting the rail (4) with a parallelogram-shaped plate (3).

* * * * *

UNITED STATES PATENT AND TRADEMARK OFFICE
CERTIFICATE OF CORRECTION

PATENT NO. : 5,076,419
DATED : December 31, 1991
INVENTOR(S) : Jorgen SOLUND

It is certified that error appears in the above-identified patent and that said Letters Patent is hereby corrected as shown below:

On the title page, item:

[30] Foreign Application Priority Data:

Delete "Jan. 29, 1988 [DK] Denmark ............442/89",
insert therefor -- Jan. 29, 1988 [DK] Denmark........442/88 --

Signed and Sealed this

Seventeenth Day of August, 1993

Attest:

BRUCE LEHMAN

*Attesting Officer*  *Commissioner of Patents and Trademarks*